(12) United States Patent
Valenta et al.

(10) Patent No.: US 7,737,223 B2
(45) Date of Patent: Jun. 15, 2010

(54) COATING COMPOSITIONS CONTAINING AMINE-HYDROXY FUNCTIONAL POLYMER AND/OR AMINE-CARBAMATE FUNCTIONAL POLYMER

(75) Inventors: Jane N. Valenta, Pittsburgh, PA (US); Edward R. Coleridge, Lower Burrell, PA (US); Steven J. Valasak, Tarentum, PA (US); Karen A. Morow, Verona, PA (US); Paul H. Lamers, Allison Park, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 256 days.

(21) Appl. No.: 11/612,513

(22) Filed: Dec. 19, 2006

(65) Prior Publication Data

US 2008/0141902 A1   Jun. 19, 2008

(51) Int. Cl.
  *C08F 8/30* (2006.01)
(52) U.S. Cl. .................... 525/330.5; 427/331; 427/337; 427/340; 427/372.2; 427/384; 427/385.5; 525/157; 525/162; 525/163; 525/178; 525/179; 525/185; 525/190; 525/329.7; 525/329.9; 525/330.3; 525/374; 525/379; 525/383; 525/377
(58) Field of Classification Search ............... 525/157, 525/163, 162, 178, 179, 185, 190, 375, 374, 525/377
See application file for complete search history.

(56) References Cited

U.S. PATENT DOCUMENTS

| | | | | |
|---|---|---|---|---|
| 3,479,328 | A | 11/1969 | Nordstrom | 260/86.1 |
| 4,147,679 | A | 4/1979 | Scriven et al. | 260/29.2 TN |
| 4,220,679 | A | 9/1980 | Backhouse | 427/401 |
| 4,403,003 | A | 9/1983 | Backhouse | 427/407 |
| 4,681,811 | A | 7/1987 | Simpson et al. | 428/413 |
| 5,071,904 | A | 12/1991 | Martin et al. | 524/458 |
| 5,084,541 | A | 1/1992 | Jacobs, III et al. | 528/45 |
| 5,098,947 | A | 3/1992 | Metzger et al. | 524/507 |
| 5,907,024 | A * | 5/1999 | Ohrbom et al. | 528/75 |
| 5,965,670 | A | 10/1999 | Mauer et al. | 525/398 |
| 6,225,434 | B1 | 5/2001 | Sadvary et al. | 528/29 |
| 6,900,279 | B2 * | 5/2005 | Coca et al. | 526/303.1 |
| 6,962,958 | B2 * | 11/2005 | Mayo et al. | 525/128 |
| 2002/0006514 | A1 * | 1/2002 | Webster et al. | 428/412 |

FOREIGN PATENT DOCUMENTS

| | | |
|---|---|---|
| WO | WO 94/10211 | 5/1994 |
| WO | WO 97/26304 | 7/1997 |
| WO | WO 00/36049 | 6/2000 |
| WO | WO 2004/069885 | 8/2004 |

* cited by examiner

*Primary Examiner*—Vasu Jagannathan
*Assistant Examiner*—Robert C Boyle
(74) *Attorney, Agent, or Firm*—Robert A. Diaz

(57) ABSTRACT

The present invention is directed to a substantially pigment-free coating composition with good cure response and improved appearance. In particular, the substantially pigment-free coating composition may comprise (a) at least one functional polymer containing amine groups and groups selected from hydroxyl and carbamate; and (b) a crosslinking agent.

23 Claims, No Drawings

COATING COMPOSITIONS CONTAINING AMINE-HYDROXY FUNCTIONAL POLYMER AND/OR AMINE-CARBAMATE FUNCTIONAL POLYMER

FIELD OF THE INVENTION

The present invention is directed to a substantially pigment-free coating composition with good cure response and improved appearance.

Color-plus-clearcoating systems involving the application of a colored or pigmented basecoat to a substrate followed by the application of a substantially transparent or clear topcoat to the basecoat, have become very popular as original finishes for automobiles. The color-plus-clear systems have outstanding properties and complete cure of the clearcoat is particularly important to develop these properties.

However, curing on an automotive assembly line can vary from the recommended conditions, and too high a temperature or too long a curing time can occur. This may result in poor coalescence or flowing out which can lead to a wrinkled appearance in the cured coating.

SUMMARY OF THE INVENTION

The present invention is directed to a substantially pigment-free coating composition comprising (a) at least one functional polymer containing amine groups and groups selected from hydroxyl and carbamate; and (b) a crosslinking agent.

Further, the present invention is directed to a multilayer system comprising a pigmented basecoat layer and a clearcoat layer comprising said at least substantially pigment-free coating composition as described immediately above.

The coating compositions of the present invention can better tolerate overcuring conditions without poor appearance, yet have good cure response for the development of excellent physical properties.

DETAILED DESCRIPTION OF THE INVENTION

The present invention is directed to a substantially pigment-free coating composition comprising at least one functional polymer containing amine groups and groups selected from hydroxyl and carbamate, and a crosslinking agent.

As used herein, by "substantially pigment-free coating composition" is meant a coating composition which forms a transparent coating, such as a clearcoat in a multi-component composite coating composition. Such compositions are sufficiently free of pigment or particles such that the optical properties of the resultant coatings are not seriously compromised. As used herein, "amine-hydroxyl functional polymer" means a polymer having both amine functionality and hydroxyl (OH) functionality. As used herein, "amine-carbamate functional polymer" means a polymer having both amine functionality and carbamate functionality. As used herein, the term "polymer" is meant to include homopolymers, copolymers and oligomers. Further, as used herein, "transparent" means that the cured coating has a BYK Haze index of less than 50 as measured using a BYK/Haze Gloss instrument. As used herein, the term acrylic polymers includes polymers prepared from both acrylic and methacrylic monomers and is referred to as (meth)acrylic. For example, the term (meth)acrylate refers to both acrylate and methacrylate and includes esters of acrylic and methacrylic acid. The term (meth)acrylic acid refers to both acrylic and methacrylic acid.

The amine-hydroxyl functional polymer and/or amine-carbamate functional polymer for use in the present invention can be selected from any such materials known to one of ordinary skill in the art, and can be prepared using a variety of methods and starting materials.

In an embodiment, the amine-hydroxyl functional polymer may be a (meth)acrylic polymer prepared by copolymerizing a hydroxyl-functional (meth)acrylic monomer and an amine-functional (meth)acrylic monomer. The amine-carbamate functional polymer can be prepared by copolymerizing a carbamate-functional (meth)acrylic monomer and an amine-functional (meth)acrylic monomer. In a further embodiment, an amine-functional (meth)acrylic monomer can be copolymerized with both a hydroxyl-functional (meth)acrylic monomer and a carbamate-functional (meth)acrylic monomer.

The hydroxyl functionality can be incorporated into the polymer through the use of hydroxyl functional monomers such as hydroxyl functional (meth)acrylic or vinyl monomers. Suitable hydroxyl functional (meth)acrylic monomers may include hydroxy alkyl (meth)acrylates, having 2 to 4 carbon atoms in the hydroxy-alkyl group including hydroxyethyl (meth)acrylate, hydroxypropyl (meth)acrylate, 4-hydroxybutyl (meth)acrylate, and the like. Also hydroxy functional adducts of caprolactone and hydroxyalkyl (meth)acrylates can be used, as well as mixtures of these hydroxyalkyl functional monomers. Non-limiting examples of hydroxyl functional (meth)acrylic monomers may include hydroxy ethyl (meth)acrylate, hydroxy butyl (meth)acrylate and hydroxy propyl (meth)acrylate.

An example of a hydroxyl functional vinyl monomer is vinyl alcohol.

In certain embodiments of the present invention, ethylenically unsaturated monomers such as ethylenically unsaturated, beta-hydroxy ester functional monomers may be used. Such monomers may be derived from the reaction of an ethylenically unsaturated acid functional monomer, such as monocarboxylic acid, for example, acrylic acid, and an epoxy compound which does not participate in the free radical initiated polymerization with such unsaturated acid functional monomer. Non-limiting examples of such epoxy compounds include glycidyl ethers and esters. Suitable glycidyl ethers include glycidyl ethers of alcohols and phenols such as butyl glycidyl ether, octyl glycidyl ether, phenyl glycidyl ether and the like. Suitable glycidyl esters include those commercially available from Shell Chemical Company under the tradename CARDURA E; and from Exxon Chemical Company under the tradename GLYDEXX-10. Alternatively, the beta-hydroxy ester functional monomers can be prepared from an ethylenically unsaturated, epoxy functional monomer, for example glycidyl (meth)acrylate and allyl glycidyl ether, and a saturated carboxylic acid, such as a saturated monocarboxylic acid, for example isostearic acid.

Further examples of suitable hydroxyl functional monomers are the reaction products of glycidyl (meth)acrylate with monocarboxylic acids such as versatic acid and the reaction product of (meth)acrylic acid with monoepoxy compounds such as CARDURA E10.

The hydroxyl functional monomer can be used in amounts of 5 to 80 percent by weight based on total weight of monomer used to prepare the (meth)acrylic polymer. The hydroxyl equivalent weight of the (meth)acrylic polymer is typically within the range of from 250 to 5600, or from 400 to 2800.

Carbamate functional groups may be incorporated into the (meth)acrylic polymer through use of a carbamate functional vinyl monomer, for example a carbamate functional alkyl ester of (meth)acrylic acid. These carbamate functional alkyl esters are prepared by reacting, for example, a hydroxyalkyl carbamate such as hydroxypropyl carbamate with (meth)acrylic anhydride. Other carbamate functional vinyl monomers are, for example, the reaction product of a hydroxyl functional (meth)acrylic monomer such as hydroxyethyl (meth)acrylate, hydroxypropyl (meth)acrylate, and the like; a diisocyanate; and a hydroxyalkyl carbamate. Such monomers are disclosed throughout U.S. Pat. Nos. 5,098,947 and 3,479,328. Still other carbamate functional vinyl monomers may be used, such as the reaction product of isocyanic acid (HNCO) with a hydroxyl functional (meth)acrylic monomer such as hydroxyethyl acrylate. Carbamate groups can also be incorporated into the acrylic monomer by reacting a hydroxyl functional (meth)acrylic monomer with a low molecular weight carbamate functional material via a "transcarbamoylation" reaction. Such a reaction may be performed at a temperature of from 130 to 170° C. In this reaction, a low molecular weight carbamate functional material derived from an alcohol or glycol ether is reacted with the hydroxyl groups of the (meth)acrylic polymer, yielding a carbamate functional (meth)acrylic polymer and the original alcohol or glycol ether.

The carbamate functional monomer can be used in an amount of from 5 to 80 percent by weight based on total weight of monomers used to prepare the (meth)acrylic polymer. The carbamate (O—C—O—NH) equivalent weight of the (meth)acrylic polymer may be within the range of from 250 to 5600, or from 400 to 2800.

In an embodiment, when both carbamate and hydroxyl functional monomers are used, their combined percents by weight are from 5 to 80 percent based on total weight of monomers used to prepare the (meth)acrylic polymer. The functional group, that is hydroxyl and carbamate, equivalent weight of the (meth)acrylic polymer may be within the range of from 250 to 5600, or from 400 to 2800.

Amine functionality may be introduced into the (meth)acrylic polymer through the use of amine functional monomer such as amino-alkyl esters of (meth)acrylic acid. Non-limiting examples can include aminoalkyl esters having one to six carbon atoms in the alkyl radical, such as aminomethyl, aminopropyl and aminohexyl ester. In an embodiment, symmetrical and asymmetrical mono-(N,N-dimethylamino)-ethyl ester, mono-(N,N-dibutylamino)-ethyl ester and mono-(N,N-dimethylamino)-hexyl ester can be used.

The amine-functional monomers are used in amounts of from 1 to 30 percent, or from 5 to 20 percent, by weight based on total weight of monomers used to prepare the (meth)acrylic polymer. The amine, that is primary, secondary or tertiary amine, equivalent weight of the (meth)acrylic polymer may be within the range of from 150 to 10000, or from 200 to 8000.

Besides the functional monomers mentioned above, other polymerizable monomers may be used in preparing the polymers of the invention. Non-limiting examples of such monomers may include alkyl esters of (meth)acrylic acid or optionally together with one or more other polymerizable ethylenically unsaturated monomers. Suitable alkyl esters of (meth)acrylic acid may include aliphatic alkyl esters containing from 1 to 30 carbon atoms, or from 4 to 18 carbon atoms in the alkyl group. Non-limiting examples may include methyl (meth)acrylate, ethyl (meth)acrylate, butyl (meth)acrylate, and 2-ethylhexyl (meth)acrylate. Suitable other copolymerizable ethylenically unsaturated monomers can include vinyl aromatic compounds such as styrene and vinyl toluene; nitriles such as acrylonitrile and methacrylonitrile; vinyl and vinylidene halides such as vinyl chloride and vinylidene fluoride; and vinyl esters such as vinyl acetate.

These monomers if used, are present in amounts of up to 60 percent by weight based on total weight of monomers used to prepare the (meth)acrylic polymer.

Both amine and hydroxyl functionality can be introduced into the polymer by reacting an epoxy-containing polymer with an amine. Non-limiting examples of epoxy-containing polymers can include epoxy-containing (meth)acrylic polymers that are copolymers of an ethylenically unsaturated monomer having at least one epoxy group and at least one polymerizable ethylenically unsaturated monomer which is free of epoxy groups.

Non-limiting examples of ethylenically unsaturated monomers containing epoxy groups are those containing 1,2-epoxy groups such as but not limited to glycidyl acrylate, glycidyl methacrylate, allyl glycidyl ether and mixtures thereof.

Non-limiting examples of ethylenically unsaturated monomers which do not contain epoxy groups can include alkyl esters of (meth)acrylic acid containing from 1 to 20 carbon atoms in the alkyl group.

Epoxy-containing (meth)acrylic polymers are described in U.S. Pat. No. 4,681,811, column 4, line 52 through column 5, line 32.

Non-limiting examples of amines that can be reacted with the epoxy-containing polymer can include primary and secondary amines [such as but not limited to aminomethylpropanol, benzylamine, butylamine, cyclohexylamine, dibutylamine, diethanolamine, diisopropanolamine, ethanolamine, hexylamine, N-methylethanolamine and mixtures thereof.

The amine-hydroxyl functional polymer or amine-carbamate functional polymer may be prepared by conventional solution polymerization techniques that are known in the art. In conducting the reaction, the monomers may be heated, typically in the presence of a suitable initiator such as organic peroxides or azo compounds, for example, benzoyl peroxide or N,N-axobis(isobutyronitrile) and optionally a chain transfer agent, in an organic solvent in which the ingredients as well as the resultant polymer product are compatible. The organic solvent may be charged to a reaction vessel and heated to reflux, optionally under an inert atmosphere. The monomers and free radical initiator may be added slowly to the refluxing reaction mixture. After the addition is complete, some additional initiator may be added and the reaction mixture held at an elevated temperature to complete the reaction.

The concentration of the amine-hydroxyl functional polymer and/or the amine-carbamate functional polymer and/or the polymer containing amine groups, hydroxyl groups and carbamate groups may be from 1 to 80 percent, or from 1 to 20 percent, by weight based on total weight of resin solids in the coating composition.

In the present invention, the amine-hydroxyl functional polymer and/or the amine-carbamate functional polymer and/or the polymer containing amine groups, hydroxyl groups and carbamate groups are/is combined with a crosslinking agent. Any suitable crosslinking agent that is reactive with hydroxyl and/or carbamate groups can be used and can be selected from those known in the art.

In an embodiment, the crosslinking agent can be an aminoplast. Aminoplasts are obtained from the condensation reaction of formaldehyde with an amine or amide. Non-limiting examples of suitable amines or amides include but are not limited to melamine, urea, or benzoguanamine. Condensates with other amines or amides can be used; for example, aldehyde condensates of glycoluril, can give a high melting crystalline product useful in powder coatings. Non-limiting examples of suitable aldehydes can include formaldehyde, acetaldehyde, crotonaldehyde, benzaldehyde and mixtures thereof.

The aminoplast may contain imino and methylol groups and at least a portion of the methylol groups can be etherified with an alcohol to modify the cure response. Any monohydric alcohol can be employed for this purpose including but not limited to methanol, ethanol, n-butyl alcohol, isobutanol, and hexanol. In an embodiment, methanol, n-butyl alcohol, or isobutanol can be used.

Suitable aminoplasts include melamine-, urea-, or benzoguanamine-formaldehyde condensates, optionally monomeric, and at least partially etherified with one or more alcohols containing from one to four carbon atoms. Suitable aminoplast resins are commercially available from Cytec Industries under the trademark CYMEL and from Solutia, Inc. under the tradename RESIMENE.

The aminoplast curing agent can be present in the coating composition in amounts ranging from 10 to 60 percent by weight based on total weight of resin solids in the coating composition.

Besides the components mentioned above, the coating compositions of the present invention may contain optional materials such as adjuvant resins or polymers such as polyesters and (meth)acrylic polymers containing hydroxyl groups and/or carbamate groups. Such adjuvant resins are free of amine functionality. Non-limiting examples of such adjuvant resins are described in U.S. Pat. No. 5,965,670, column 2 line 45 through column 5, line 14 and column 5, lines 46 through 65. Also see U.S. Pat. No. 6,225,434 column 9, line 60 to column 10, line 33.

In a non-limiting embodiment, the coating composition of the present invention may include (i) a functional polymer containing groups selected from hydroxyl and carbamate; and (ii) a functional polymer containing hydroxyl groups and amine groups, wherein one or both of these functional polymers (i and/or ii) may comprise amine functionality; and a crosslinking agent. In this embodiment, the functional polymer (ii) may be present in an amount of from 1 to 20 percent by weight based on total resin solids weight of the coating composition.

If used, the adjuvant resins are present in amounts of up to 20 percent by weight based on total weight of resin solids in the coating composition.

Besides the adjuvant resins mentioned above, an auxiliary crosslinking agent may also be used in the present invention and may be selected from such materials known in the art. Suitable auxiliary crosslinking agents may include blocked isocyanates. In an embodiment, the auxiliary crosslinking agent is a carbamoylated triazine of the formula $C_3N_3(NHCOXR)_3$, wherein X is nitrogen, oxygen, sulfur, phosphorus, or carbon, and R is a lower alkyl group having 1 to 12 carbon atoms, or mixtures of lower alkyl groups. In an embodiment, the X moiety is oxygen or carbon. In a further embodiment, the X moiety is oxygen. In an embodiment, the R moiety has 1 to 8 carbon atoms, for example, methyl, ethyl, n-propyl, i-propyl, butyl, n-octyl, or 2-ethylhexyl. In a further embodiment, R is a mixture of methyl and butyl groups. Such compounds and the preparation thereof are described in detail in U.S. Pat. No. 5,084,541.

If used, the auxiliary crosslinking agent is present in amounts of up to 20 percent, or up to 10 percent, by weight based on total weight of resin solids in the coating composition.

The coating compositions of the present invention may contain other optional ingredients such as but not limited to plasticizers, anti-oxidants, hindered amine light stabilizers, UV light absorbers and stabilizers; and the like. These ingredients may be present (on an individual basis) in amounts up to 5 percent by weight based on total weight of resin solids in the coating composition.

In an embodiment, the coating composition of the present invention may include from 30 to 50 percent of an aminoplast, from 30 to 50 percent of a polyester carbamate, and from 1 to 20 percent of a functional polymer containing amine groups and hydroxyl groups, wherein the percentages being by weight based on total resin solids weight of the coating composition. Optionally, the coating composition of this embodiment, may further comprise a hydroxyl functional polymer free of amine groups in an amount of from 5 to 20 percent by weight based on total resin solids weight of the coating composition. Further, in this embodiment, a hydroxyl functional (meth)acrylic polymer free of amine groups may also be present in an amount of up to 10% by weight based on total resin solids weight of the coating composition.

The coating compositions of the present invention may be used as clear coats in multi-component composite coating compositions such as color-plus-clear composite coating compositions. A color-plus-clear composition typically comprises a base coat deposited from a pigmented or colored film-forming composition, and a transparent top coat (clear coat) applied over the base coat.

The coating compositions of the present invention may be organic solvent based. They may, however, be dispersed or solubilized in aqueous based solvents.

The film-forming composition of the base coat in the color-plus-clear composite coating can be any of the compositions useful in coatings applications, such as automotive applications. The film-forming composition of the base coat comprises a resinous binder and a colorant such as a pigment. Non-limiting examples of useful resinous binders include acrylic polymers, polyesters, including alkyds, and polyurethanes. In addition to resinous binders, the base coat may contain suitable crosslinking agents such as aminoplasts, polyisocyanates, polyacids, and the like depending on the functional groups present on the resinous binder. The crosslinking agent may be selected from those previously described herein.

The resinous binders for the base coat can be organic solvent-based materials such as those described in U.S. Pat. No. 4,220,679, column 2, line 24 through column 4, line 40. Also, water-based coating compositions such as those described in U.S. Pat. Nos. 4,403,003; 4,147,679; and 5,071,904 can be used as the binder in the base coat composition.

The base coat also contains pigments and other additional components traditionally used in base coat formulations. Suitable pigments include metallic or non-metallic pigments. Suitable metallic pigments include aluminum flake, copper bronze flake or metal oxide coated mica. Non-limiting examples of metallic pigments include inorganic pigments such as titanium dioxide, iron oxide, chromium oxide, lead chromate, and carbon black, or organic pigments such as phthalocyanine blue and phthalocyanine green. In general, the pigment may be incorporated into the base coat composition in amounts of from 1 to 80 percent by weight based on total weight of the coating composition.

Various additional components that are well known in the art may be added to the base coat composition and include surfactants, UV stabilizers, flow control agents, thixotropic agents, fillers, organic cosolvents, catalysts, and other customary auxiliaries. These materials can constitute up to 40 percent by weight of the total weight of the coating composition.

The base coating compositions can be applied to various substrates to which they adhere. The compositions can be applied by conventional means including brushing, dipping, flow coating, spraying and the like, but they are most often applied by spraying. The usual spray techniques and equipment for air spraying, airless spraying and electrostatic spraying and either manual or automatic methods can be used. Examples of these substrates are wood, metals, glass, plastic, foam, elastomeric substrates and the like. In an embodiment, the color-plus-clear composite coating is useful in applications over metals and elastomeric substrates that are found on motor vehicles.

During application of the base coat to the substrate, a film of the base coat is formed on the substrate. The thickness of the film of the base coat can vary. In an embodiment, the thickness may be from 0.1 to 5 mils (2.54 to 127 microns), or from 0.1 to 2 mils (2.54 to 50.4 microns).

After forming a film of the base coat on the substrate, the base coat can be cured or alternately given a drying step in which solvent is driven out of the base coat film by heating or an air drying period before application of the clear coat. Suitable drying conditions will depend on the particular base coat composition and on the ambient humidity if the composition is waterborne. In an embodiment, a drying time of from 1 to 15 minutes at a temperature of from 75 to 200° F. (21 to 93° C.) will be adequate.

In an embodiment, the clear topcoat composition may be applied to the base coat by spray application. As mentioned above, the clear topcoat can be applied to a cured base coat or to a dried base coat before the base coat has been cured. In the latter instance, the two coatings are then heated to cure both layers simultaneously. The curing conditions can vary. in an embodiment, the cure is at a temperature of from 265 to 300° F. (129 to 149° C.) for a period of from 20 to 30 minutes. The clear coating thickness (dry film thickness) can vary. In an embodiment, the clear coating thickness may be from 1 to 6 mils (25.4 to 152.4 microns).

The coating compositions of the present invention have good cure response along with excellent appearance. There is a relatively wide window for curing conditions such that if the compositions are cured for too long a time or too high a temperature, appearance will not be adversely affected.

Without intending to be bound by any mechanism, it is believed that the hydroxyl functionality of the amine-hydroxyl functional polymer and/or the amine-carbamate functional polymer reacts with the crosslinking agent and, the amine functionality of the amine-hydroxyl functional polymer and/or the amine-carbamate functional polymer remains substantially unreacted. The remaining amine functionality may be responsible for slowing down the rate of reaction. For example, in general, the addition of a base to an acid catalyzed reaction cause a slower cure. A slower cure can result in improved appearance (e.g., reduced wrinkling) of a cured coating.

Other than in any operating examples, or where otherwise indicated, all numbers expressing quantities of ingredients, reaction conditions and so forth used in the specification and claims are to be understood as being modified in all instances by the term "about." Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

Further, it should be understood that plural encompasses singular and vice versa; for example, "a" or "an" can include more than one. For example, although all references made herein to "an" amine-hydroxy functional polymer, "an" amine-carbamate functional polymer, "a" crosslinking agent, and the like, one or more of any of these compounds or things can be used. As used herein, the prefix "poly" refers to two or more.

The invention will be further described by reference to the following examples. Unless otherwise indicated, all parts are by weight.

The following examples are intended to illustrate the invention, and should not be construed as limiting the invention in any way.

EXAMPLES

Whereas particular embodiments of this invention have been described above for purposes of illustration, it will be evident to those skilled in the art that numerous variations of the details of the present invention may be made without departing from the invention as defined in the claims.

Example 1

Acrylic 1.

| | Raw Material | Amount (g) |
|---|---|---|
| Chg 1 | Aromatic 150 | 308 |
| | Aromatic 100 | 462 |
| Chg 2 | Luperox 575[2] | 90 |
| Chg 3 | ACE Monomer[1] | 1000 |
| | Styrene | 600 |
| | 2-Ethylhexylacrylate (EHA) | 400 |

[1]ACE Monomer is the reaction product of 77.4 g Cardura E and 22.6 g acrylic acid.
[2]Luperox 575 is a free radical initiator which is commercially available from Atochem.

To a four-necked, 5-liter reaction flask outfitted with a stirrer, gas inlet, thermometer and condenser was added the contents of Chg 1. The reaction mixture was heated to a temperature of 110° C., and Chg 2 and Chg 3 were then fed simultaneously over a period of two hours. After the additions were complete, the reaction mixture was held for an additional two hours. The reaction mixture was then cooled to yield an acrylic polymer with a solids content of 67.9%, a Gardner-Holt viscosity of Z2+, an acid value of 2, and an OH value of 71.

Example 2

Acrylic 2.

| | Raw Material | Amount (g) |
|---|---|---|
| Chg 1 | Aromatic 150 | 308 |
| | Aromatic 100 | 462 |
| Chg 2 | DTAP[1] | 60 |
| Chg 3 | ACE Monomer | 1000 |
| | Glycidylmethacrylate (GMA) | 200 |
| | Styrene | 533 |
| | 2-EHA | 267 |
| Chg 4 | Benzylamine | 152 |
| | Aromatic 100 | 63 |

[1]DTAP is ditertiary amyl peroxide; a free radical initiator.

To a four-necked, 5-liter reaction flask outfitted with a stirrer, gas inlet, thermometer and condenser was added the contents of Chg 1. The reaction mixture was heated to a temperature of 160° C. and, Chg 2 and Chg 3 were then fed simultaneously over a period of two hours. After the additions were complete, the reaction mixture was held for an additional two hours. The reaction mixture was then cooled and Chg 4 was added over a period of ten minutes. The reaction was held at a temperature of 120° C. for one hour. The reaction mixture was then cooled to yield an acrylic polymer with a solids content of 70% and a Gardner-Holt viscosity of Z4−.

Example 3

Acrylic 3.

| | Raw Material | Amount (g) |
|---|---|---|
| Chg 1 | Aromatic 150 | 308 |
| | Aromatic 100 | 462 |
| Chg 2 | DTAP | 60 |
| Chg 3 | ACE Monomer | 1000 |
| | GMA | 200 |
| | Styrene | 533 |
| | 2-EHA | 267 |
| Chg 4 | N-Methylethanolamine | 106 |
| | Aromatic 100 | 45 |

To a four-necked, 5-liter reaction flask outfitted with a stirrer, gas inlet, thermometer and condenser was added the contents of Chg 1. The reaction mixture was heated to a temperature of 160° C. and, Chg 2 and Chg 3 were then fed simultaneously over a period of two hours. After the additions were complete, the reaction mixture was held for an additional two hours. The reaction mixture was then cooled and Chg 4 was added over a period of ten minutes. The reaction was held at a temperature of 120° C. for one hour. The reaction mixture was then cooled to yield an acrylic polymer with a solids content of 70% and a Gardner-Holt viscosity of Z4−.

Example 4

Acrylic 4.

| | Raw Material | Amount (g) |
|---|---|---|
| Chg 1 | Aromatic 150 | 308 |
| | Aromatic 100 | 462 |
| Chg 2 | Luperox 575 | 90 |
| Chg 3 | ACE Monomer | 1000 |
| | Styrene | 400 |
| | Dimethylaminoethyl methacrylate (DMAEMA) | 400 |
| | 2-EHA | 200 |

To a four-necked, 5-liter reaction flask outfitted with a stirrer, gas inlet, thermometer and condenser was added the contents of Chg 1. The reaction mixture was heated to a temperature of 110° C. and, Chg 2 and Chg 3 were then fed simultaneously over a period of two hours. After the additions were complete, the reaction mixture was held for an additional two hours. The reaction mixture was then cooled to yield an acrylic polymer with a solids content of 69.9%, a Gardner-Holt viscosity of Z5+, an acid value of 1, and an OH value of 66.

Example 5

Acrylic 5.

| | Raw Material | Amount (g) |
|---|---|---|
| Chg 1 | Aromatic 150 | 385 |
| | Aromatic 100 | 578 |
| Chg 2 | DTAP | 75 |
| Chg 3 | ACE Monomer | 1250 |
| | GMA | 250 |
| | Styrene | 667 |
| | 2-EHA | 333 |
| Chg 4 | N-Methylethanolamine | 134 |

To a four-necked, 5-liter reaction flask outfitted with a stirrer, gas inlet, thermometer and condenser was added the contents of Chg 1. The reaction mixture was heated to a temperature of 160° C. and, Chg 2 and Chg 3 were then fed simultaneously over a period of two hours. After the additions were complete, the reaction mixture was held for an additional two hours. The reaction mixture was then cooled and Chg 4 was added over a period of ten minutes. The reaction was held at a temperature of 120° C. for one hour. The reaction mixture was then cooled to yield an acrylic polymer with a solids content of 72%, a Gardner-Holt viscosity of Z3+, an acid value of 1, and an OH value of 62.

Example 6

Pre-mixture A was prepared by mixing the following components sequentially with mild agitation. In each case, the resin was added to 137 parts by weight (63.8 solids) of the pre-mixture.

| Pre-Mixture A | | |
|---|---|---|
| Ingredient | Parts by weight (grams) | Solid weights (grams) |
| n-Butyl acetate | 3.8 | |
| Butyl Carbitol ® acetate[1] | 7.0 | |
| Xylene | 26 | |
| Tinuvin 928[2] | 0.86 | 0.86 |
| Tinuvin 292[3] | 0.76 | 0.76 |
| Tinuvin 400[4] | 1.2 | 1.0 |
| Cymel 1156[5] | 3.9 | 3.9 |
| Cymel 202[6] | 35 | 28 |
| Acid catalyst[7] | 0.7 | 0.48 |
| LAROTACT LR 9018[8] | 7.4 | 3.7 |
| Sag Control agent[9] | 50.3 | 25 |
| Byk 337[10] | 0.10 | 0.02 |
| Reduction Information: | | |
| Aromatic Solvent - 100 Type | | |
| Spray viscosity[11] (sec) | 37-38 | |
| Paint temperature (° F.) | 75 | |

[1]2-(2-Butoxyethoxy) ethyl acetate is commercially available from Dow Chemical Co.
[2]UV absorber available from Ciba Specialty Chemicals Corp.
[3]Sterically hindered amine light stabilizer commercially available from Ciba Additives.
[4]UV absorber available from Ciba Specialty Chemicals Corp.
[5]Melamine formaldehyde resin commercially available from Cytec Industries.
[6]Melamine formaldehyde resin commercially available from Cytec Industries.
[7]Dodecyl benzene sulfonic acid solution available from Chemcentral.
[8]Tris (alkyl carbamoyl) triazine available from BASF AG.
[9]SCA acrylic resin solution from PPG.
[10]Polyether modified polydimethylsiloxane solution from Byk Chemie.
[11]Viscosity measured in seconds with a #4 FORD efflux cup at ambient temperature.

TABLE 1

| Ingredient | Example 1 Comparative | Example 2 | Example 3 | Example 4 |
|---|---|---|---|---|
| Resin Example 1 | 57.9 (39.3) | | | |
| Resin Example 2 | | 56.1 (39.3) | | |
| Resin Example 3 | | | 56.1 (39.3) | |
| Resin Example 4 | | | | 56.1 (39.3) |

Pre-mixture B was prepared by mixing the following components sequentially with mild agitation. In each case, the resin was added to 148 parts by weight (68.2 solids) of the pre-mixture.

| Pre-Mixture B | | |
|---|---|---|
| Ingredient | Parts by weight (grams) | Solid weights (grams) |
| n-Butyl acetate | 3.8 | |
| Butyl Carbitol ® acetate[1] | 7.0 | |
| Xylene | 26 | |
| Tinuvin 928[2] | 0.86 | 0.86 |
| Tinuvin 292[3] | 0.76 | 0.76 |
| Tinuvin 400[4] | 1.2 | 1.0 |
| Cymel 1156[5] | 3.9 | 3.9 |
| Cymel 202[6] | 35 | 28 |
| Acid catalyst[7] | 2.2 | 0.8 |
| LAROTACT LR 9018[8] | 7.4 | 3.7 |
| Sag Control agent[9] | 50.3 | 25 |
| Byk 325[10] | 0.20 | 0.10 |
| Byk 390[11] | 0.40 | 0.21 |
| Silica Dispersion[12] | 8.36 | 3.9 |
| Reduction Information: | | |
| Aromatic Solvent - 100 Type | | |
| Spra viscosity[13] (sec) | 38 | |
| Paint temperature (° F.) | 75 | |

[1]2-(2-Butoxyethoxy) ethyl acetate is commercially available from Dow Chemical Co.
[2]UV absorber available from Ciba Specialty Chemicals Corp.
[3]Sterically hindered amine light stabilizer commercially available from Ciba Additives.
[4]UV absorber available from Ciba Specialty Chemicals Corp.
[5]Melamine formaldehyde resin commercially available from Cytec Industries.
[6]Melamine formaldehyde resin commercially available from Cytec Industries.
[7]Nacure 4167 catalyst solution available from King Industries.
[8]Tris (alkyl carbamoyl) triazine available from BASF AG.
[9]SCA acrylic resin solution from PPG.
[10]Polysiloxane solution from Byk Chemie.
[11]Polyacrylate solution from Byk Chemie.
[12]A dispersion containing AEROSIL R812 silica (available from Degussa),
[13]Viscosity measured in seconds with a #4 FORD efflux cup at ambient temperature.

TABLE 2

| Ingredient | Example 5 (Comparative) | Example 6 | Example 7 |
|---|---|---|---|
| Acrylic resin[1] | 49.2 (36.4) | 35.7 (26.4) | |
| Resin Example 4 | | 14.3 (10) | 52 (36.4) |

[1]A polymer comprising Cardura E, styrene, hydroxyethyl methacrylate, butyl acrylate, acrylic acid at a Mn of about 3700 having a hydroxyl EW on solids of 330. Polymer is 76% by weight solids in Aromatic 100/Aromatic 150 at a weight ratio of 61/39.

The coating compositions were formulated by first forming a pre-mixture as shown below as Pre-mixture C and then adding the resins as shown in Table 3 below. In each case, the resin was added to 155.3 parts by weight (89.4 solids) of the pre-mixture.

| Pre-Mixture C | | |
|---|---|---|
| Ingredient | Parts by weight (grams) | Solid weights (grams) |
| Diisobutyl ketone | 16.8 | |
| DOWANOL DPM[1] | 2.68 | |
| Aromatic Solvent - 100 Type | 6.1 | |
| DOWANOL PM Acetate[2] | 11.3 | |
| TINUVIN 900[3] | 1.12 | 1.12 |
| TINUVIN ® 328[4] | 1.54 | 1.54 |
| Acrylic Rheology Control Agent[5] | 6.18 | 1.85 |
| Anti-sag Solution[6] | 6.53 | 2.60 |
| RESIMENE 757[7] | 41.4 | 40.14 |
| Isobutyl alcohol | 2.57 | |
| Carbamoylated polyester[8] | 54.4 | 39.4 |
| TINUVIN 292[9] | 0.33 | 0.33 |
| Acid catalyst[10] | 1.24 | 0.87 |
| Polybutyl acrylate[11] | 0.33 | 0.20 |
| DISPARLON OX-60[12] | 0.37 | 0.19 |

-continued

Pre-Mixture C

| | Parts by weight (grams) | Solid weights (grams) |
|---|---|---|
| Siloxane Additive[13] (KP-99) | 2 | 1 |
| Siloxane Additive[14] (KP-15) | 0.42 | 0.2 |
| Reduction Information: | | |
| Spray viscosity[15] (sec) | 30 | |
| Paint temperature (° F.) | 75 | |

[1]Dipropylene glycol monomethyl ether, available from Dow Chemical Co.
[2]Methyl ether propylene glycol acetate, available from Dow Chemical Co.
[3]Benzotriazole derivative available from CIBA Additives.
[4]2-(2'-Hydroxy-3',5'-ditert-amylphenyl) benzotriazole UV light stabilizer available from Ciba Additives.
[5]A crosslinked polymeric dispersion comprising ethylene glycol dimethacrylate, styrene, butyl acrylate, and methyl methacrylate. The dispersion is 31% by weight in oxo-hexyl acetate (available from Exxon Chemicals). The number average particle size is 1000 angstroms.
[6]A dispersion containing AEROSIL R812 S silica (available from Degussa), and a polymeric component which comprises hydroxy propyl acrylate, styrene, butyl methacrylate, butyl methacrylate acrylic acid at an Mw of 7000 having a hydroxy EW on solids of 325. Polymer is 67.5% by weight solids in methyl ether of propylene glycol monoacetate/SOLVESSO 100 (available from Exxon) at a weight ratio of 60/40.
[7]Melamine formaldehyde resin commercially available from Solutia Inc.
[8]Carbamate functional polyester resin solution (composition described in U.S. Pat. No. 6,592,999).
[9]Sterically hindered amine light stabilizer commercially available from Ciba Additives.
[10]Dodecyl benzene sulfonic acid solution available from Chemcentral.
[11]A flow control agent having a Mw of about 6700 and a Mn of about 2600 made in xylene at 62.5% solids available from DuPont.
[12]Additive available from King Industries.
[13]Siloxane additive from PPG Industries.
[14]Siloxane additive from PPG Industries.
[15]Viscosity measured in seconds with a #4 FORD efflux cup at ambient temperature. Diisobutyl ketone was used as the reducing solvent.

TABLE 3

| | Example No. | |
|---|---|---|
| Resin | 8 | 9 |
| Carbamoylated acrylic[1] | 24.7 (15.3) | |
| Resin Example 5 | | 21.3 (15.3) |

[1]Carbamate functional acrylic resin solution as described in U.S. Pat. No. 6,592,999, prepared from 40% by weight hydroxy propyl acrylate, 58% by weight butyl methacrylate and 2% by weight methyl styrene dimer, carbamoylated with methyl carbamate to give a 62% by weight resin solids solution having a hydroxyl value of 27.1

The film forming compositions of Examples 5-7 were spray applied to a pigmented basecoat to form color-plus-clear composite coatings over primed electrocoated steel panels. The panels used were cold rolled steel panels (size 4 inches×12 inches (10.16 cm by 30.48 cm)). Panels for Examples 5 through 7 were coated with ED6060 electrocoat and 1177225A primer, both available from PPG Industries, Inc. For Examples 8 and 9, panels were coated with ED6060 electrocoat, available from PPG Industries, Inc.

Examples 5 through 7 used Reflex Silver, a silver-pigmented water-borne basecoat, available from PPG Industries, Inc. A water-borne basecoat, Linen Gold, available from PPG Industries, Inc. was used for examples 8 and 9, Basecoats were automated spray applied to the electrocoated and primed steel panels at ambient temperature (about 70° F. (21° C.)). A dry film thickness of about 0.6 to 0.8 mils (about 15 to 20 micrometers) was targeted for the basecoats. The water-borne basecoat panels were dehydrated for 10 minutes @ 176° F. (80° C.) prior to clearcoat application. The solvent-borne basecoat panels were only given an air flash at ambient temperature for one to five minutes.

The clear coating compositions were each automated spray applied to a basecoated panel at ambient temperature in two coats with an ambient flash between applications. The clearcoats were targeted for a 1.6 to 1.8 mils (about 41 to 46 micrometers) dry film thickness. All coatings were allowed to air flash at ambient temperature before the oven. Panels were baked for thirty minutes at 285° F. (141° C.) to fully cure the coating(s). The panels were baked in the horizontal and vertical positions. Properties for the coatings are reported below in Tables 4-6. Table 4 illustrates how various amines affect gel point. Table 5 illustrates how the amine functional resin provides appearance improvements. Table 6 illustrates how the amine functional resin can be used to improve base/clear cure compatibility resulting in an appearance improvement.

TABLE 4

| Example No. | Gel Point[1] (minutes) |
|---|---|
| 1 Comparative | 9.2 |
| 2 | 9.6 |
| 3 | 12.2 |
| 4 | 12.2 |

[1]Gel points were determined from wet samples using the Paar Physica LDS 200 Controlled Stress Rheometer in oscillatory mode using a 25 mm cone, 1 Hz frequency and 5% amplitude. The complex viscosity was measured vs. time over, until a maximum viscosity was achieved

TABLE 5

| Example No. | Sharpness[1] Horizontal/Vertical | Luster[1] Horizontal/Vertical |
|---|---|---|
| 5 (Comparative) | 44/42 | 32/30 |
| 6 | 53/47 | 41/36 |
| 7 | 59/52 | 47/40 |

[1]Appearance Sharpness and Luster values were measured with a BYK Wavescan DOI meter, available from Byk Gardner. Higher values indicate better appearance.

TABLE 6[1]

| Example No. | 20° Gloss[2] | Autospect Rating[3] (Combination Rating) | Clearcoat Wrinkling |
|---|---|---|---|
| 8 (Comparative) | 87 | 28 | Yes |
| 9 | 89 | 60 | No |

[1]Appearance values are provided for the horizontal only panels.
[2]20° gloss was measured with a Statistical Novo-Gloss 20° gloss meter, available from Paul N. Gardner Company, Inc.
[3]Combination Rating (Ford weighting scale) was obtained with an Autospect paint measurement system, available from Perceptron, Inc. Higher values indicate better appearance.

The invention claimed is:

1. A substantially pigment-free coating composition comprising:
   a. at least one functional polymer containing hydroxyl and amine groups present in an amount of from 1 to 20 percent by weight based on total resin solids weight of the coating composition;
   b. a functional polymer containing groups comprising hydroxyl and carbamate; and
   c. a crosslinking agent.

2. The coating composition of claim 1 wherein a) is present in an amount of from 1 to 80 weight percent based on total resin solids weight of the coating composition.

3. The coating composition of claim 1 wherein (c) is present in an amount of from 10 to 60 weight percent based on total resin solids weight of the coating composition.

4. The coating composition of claim 1 wherein polymers a) and b) are each independently selected from (meth)acrylic polymers.

5. The coating composition of claim 1, wherein the coating composition is solventborne.

6. The coating composition of claim 1 in which (a) contains hydroxyl groups and amine groups and which has a hydroxy equivalent weight of 250 to 5,600 and an amine equivalent weight of 150 to 10,000.

7. The coating composition of claim 1 wherein (b) further comprises amine groups.

8. The coating composition of claim 7 in which (b) has a carbamate equivalent weight of 250 to 5,600 and an amine equivalent weight of 150 to 10,000.

9. The coating composition of claim 1 wherein the crosslinking agent is an aminoplast.

10. The coating composition of claim 9 wherein the crosslinking agent is a condensate of melamine and formaldehyde.

11. The coating composition of claim 1 wherein a) and b) and c) are further blended with a hydroxyl functional polymer free of amine functionality.

12. The coating composition of claim 11 wherein the hydroxyl functional polymer comprises a polyester.

13. The coating composition of claim 11 wherein the hydroxyl functional polymer comprises a (meth)acrylic polymer.

14. The coating composition of claim 1 further comprising an auxiliary crosslinking agent.

15. The coating composition of claim 14 wherein said auxiliary crosslinking agent comprises a blocked isocyanate.

16. The coating composition of claim 14 wherein the crosslinking agent is a triazine of the formula $C_3N_3(NH\text{-}COOR)_3$ where R is alkyl containing 1 to 12 carbon atoms or mixtures of such alkyl groups.

17. A multilayer system comprising:
a) a pigmented basecoat layer; and
b) a clearcoat layer comprising the substantially pigment-free coating composition of claim 1.

18. The multilayer system of claim 17, where the basecoat layer is deposited from a waterborne basecoat composition.

19. The multilayer system of claim 17, wherein the basecoat layer is deposited from a solventborne composition.

20. The coating composition of claim 1 in which (a) has an amine equivalent weight of 150 to 10,000.

21. A substantially pigment-free composition comprising:
a) from 30 to 50% of an aminoplast;
b) from 30 to 50% of a polyester carbamate; and
c) from 1 to 20% of a functional polymer containing amine groups and hydroxyl groups wherein the percentages being by weight based on total resin solids weight of the coating composition.

22. The coating composition of claim 21 further comprising a hydroxyl functional polymer free of amine groups in an amount of from 5 to 20 percent by weight based on total resin solids weight of the coating composition.

23. The coating composition of claim 21 further comprising a hydroxyl functional (meth)acrylic polymer free of amine groups in an amount of up to 10% by weight based on total resin solids weight of the coating composition.

* * * * *